US012620928B2

(12) United States Patent　　(10) Patent No.:　US 12,620,928 B2
Stevenson　　(45) Date of Patent:　　May 5, 2026

(54) SOLAR ROOF STRUCTURE

(71) Applicant: NULOK GLOBAL PTY LTD, Mount Kuring-Gai (AU)

(72) Inventor: Randal Stevenson, Mount Kuring-Gai (AU)

(73) Assignee: NULOK GLOBAL PTY LTD, New South Wales (AU)

( * ) Notice: Subject to any disclaimer, the term of this patent is extended or adjusted under 35 U.S.C. 154(b) by 323 days.

(21) Appl. No.: 18/254,076

(22) PCT Filed: Aug. 25, 2021

(86) PCT No.: PCT/AU2021/050970

§ 371 (c)(1),
(2) Date: May 23, 2023

(87) PCT Pub. No.: WO2022/109654

PCT Pub. Date: Jun. 2, 2022

(65) Prior Publication Data

US 2024/0030857 A1　　Jan. 25, 2024

(30) Foreign Application Priority Data

Nov. 27, 2020　(AU) ................................. 2020904400

(51) Int. Cl.
*H02S 20/25*　　(2014.01)
*E04D 1/30*　　(2006.01)
(Continued)

(52) U.S. Cl.
CPC ................ *H02S 20/25* (2014.12); *E04D 1/30* (2013.01); *E04D 12/004* (2013.01); *H02J 3/38* (2013.01);
(Continued)

(58) Field of Classification Search
CPC ........... H02S 20/25; H02S 40/36; E04D 1/30
See application file for complete search history.

(56) References Cited

U.S. PATENT DOCUMENTS 7,444,790 B2　11/2008　Hick
11,251,744 B1 *　2/2022　Bunea ..................... H02S 20/25
(Continued)

FOREIGN PATENT DOCUMENTS

DE　　202010007997 U1　10/2010

*Primary Examiner* — Babajide A Demuren
(74) *Attorney, Agent, or Firm* — Shay Glenn LLP

(57) ABSTRACT

Described herein is a solar roof tile system (102) for a building. The system (102) includes a supporting structure (108) adapted to be mounted to the building and having one or more supporting formations (110, 112) for supportively engaging one or more solar roof tiles (104). The solar roof tiles (104) are adapted to be releasably engaged with the supporting structure (108) such that the solar roof tiles (104) can be independently released from the roof (100) without removing adjacent solar or non-solar roof tiles (106). Each of the solar roof tiles (104) include one or more electrical junction boxes (152, 154) disposed on an underside surface (150) for receiving electrical cables to form an electric circuit with others of the one or more solar roof tiles (104) and an inverter. The supporting formations (110) are fixedly mounted to the building and adapted to releasably support the one or more solar roof tiles (104) in respective operative positions, and wherein each supporting formation is electrically connected to an earthing circuit.

22 Claims, 16 Drawing Sheets

(51) Int. Cl.

| | |
|---|---|
| *E04D 12/00* | (2006.01) |
| *H02J 3/38* | (2006.01) |
| *H02J 7/35* | (2006.01) |
| *H02S 40/32* | (2014.01) |
| *H02S 40/34* | (2014.01) |
| *H02S 40/36* | (2014.01) |
| *H02S 40/38* | (2014.01) |
| *H02S 40/42* | (2014.01) |

(52) U.S. Cl.
  CPC ................ *H02J 7/35* (2013.01); *H02S 40/32* (2014.12); *H02S 40/34* (2014.12); *H02S 40/36* (2014.12); *H02S 40/38* (2014.12); *H02S 40/425* (2014.12); *E04D 2001/308* (2013.01); *H02J 2300/24* (2020.01)

(56)                References Cited

U.S. PATENT DOCUMENTS

| | | | |
|---|---|---|---|
| 11,368,123 B2 * | 6/2022 | Ishida ........................ | E04D 1/30 |
| 2001/0027804 A1 | 10/2001 | Inoue et al. | |
| 2001/0034982 A1 * | 11/2001 | Nagao .................... | H02S 20/23 |
| | | | 52/173.3 |
| 2002/0134422 A1 * | 9/2002 | Bauman ................. | B64G 1/443 |
| | | | 136/291 |
| 2005/0239394 A1 * | 10/2005 | O'Hagin ................... | E04D 1/30 |
| | | | 454/366 |
| 2008/0302408 A1 * | 12/2008 | Bressler ................. | H02S 20/25 |
| | | | 136/251 |
| 2016/0134231 A1 | 5/2016 | Wu et al. | |
| 2017/0237390 A1 | 8/2017 | Hudson et al. | |
| 2019/0123679 A1 | 4/2019 | Rodrigues | |
| 2019/0123680 A1 | 4/2019 | Rodrigues | |
| 2020/0263905 A1 | 8/2020 | Daniels | |

* cited by examiner

SOLAR ROOF STRUCTURE

TECHNICAL FIELD

The present invention relates to rooftop solar installations and in particular to a solar roof tile system and associated cable management and junction box housing.

While some embodiments will be described herein with particular reference to that application, it will be appreciated that the invention is not limited to such a field of use, and is applicable in broader contexts.

BACKGROUND OF INVENTION

Traditional solar panels are installed on top of the roof meaning that all electrical cables relating to the solar panels are outside the roof cavity. An example of this type of system is described in US Patent Application Publication 2017/0237390 to SolarCity Corporation and entitled "Building Integrated Photovoltaic Roofing Assemblies and Associated Systems and Methods". This document discloses a rooftop solar system that is installed over an existing rooftop structure but has the appearance of an integrated solar installation. This system requires an entirely new structure to be formed over the existing roof and intermediate layers to be installed between the structure and roof. Solar panels are installed into pans that are fit onto this new structure and no access is available to roof sarking or an internal roof cavity. Furthermore, the system in US 2017/0237390 does not provide for airflow under the solar panels, which can give rise to failure and reduced operational lifetime of the panels.

In an alternative type of system, termed a "roof integrated solar system", the solar roof tiles are directly integrated into the roof structure in place of traditional roof tiles. In these systems, solar roof tiles or solar inserts make up part of the roof and lay flush with the surrounding roof tiles when installed to provide a seamless integrated appearance. When installed on a roof, the electrical cables of a solar roof tile are inside the roof cavity and can become a safety hazard for both installers and future home and solar maintenance.

As the electrical cables are laid on top of the roof sarking/felt and over the battens, installers have often step on these when installing the roof. As a result, the cables can be damaged very easily causing connection problems or earthing issues. In some cases, the damaged cables can result in parts of the roof becoming electrically live, which is very dangerous.

Furthermore, it is also difficult to replace faulty cables or solar roof tiles once the roof tiles have been installed. This currently involves the removal of a number of roof tiles so the faulty tile/cable can be disconnected from the system and replaced.

Another concern is that if a worker cuts a hole in the sarking/felt from inside the roof space they run the risk of cutting through a live electrical cable, which could cause serious injury. There is also a fire risk if a damaged cable is not noticed initially but becomes more damaged over time.

A reference herein to a patent document or any other matter identified as prior art, is not to be taken as an admission that the document or other matter was known or that the information it contains was part of the common general knowledge as at the priority date of any of the claims.

SUMMARY OF INVENTION

A first aspect of the present invention provides a solar roof tile system for a building, the system including:

a supporting structure adapted to be mounted to the building and having one or more supporting formations for supportively engaging one or more solar roof tiles, wherein the supporting structure and the one or more solar roof tiles collectively define a roof of the building having an internal roof cavity;

one or more solar roof tiles adapted to be releasably engaged with the supporting structure such that the one or more solar roof tiles can be independently released from the roof to access the roof cavity without removing adjacent solar or non-solar roof tiles, the one or more solar roof tiles having an upper active solar surface and an underside surface;

wherein each of the one or more solar roof tiles include one or more electrical junction boxes disposed on the underside surface for receiving electrical cables to form an electric circuit with others of the one or more solar roof tiles and an inverter; and wherein the supporting formations are fixedly mounted to the building and adapted to releasably support the one or more solar roof tiles in respective operative positions, and wherein each supporting formation is electrically connected to an earthing circuit.

In some embodiments, each of the one or more solar roof tiles include a positive junction box disposed at a first location on the underside surface and a negative junction box disposed at a second location on the underside surface separate from the first location.

In some embodiments, the one or more solar roof tiles include a first lateral side and a second lateral side and wherein the first location is adjacent the first lateral side and the second location is adjacent the second lateral side. Preferably, in an engaged operative position in the supporting structure, the positive junction box of a first solar roof tile is positioned adjacent the negative junction box of a laterally adjacent second solar roof tile.

In some embodiments, the one or more solar roof tiles include flexible electrical conduits for connecting the positive junction box of the first solar roof tile to the negative junction box of the second solar roof tile. In some embodiments, the flexible electrical conduits are colour coded based on electrical polarity. In some embodiments, the flexible electrical conduits include a non-conductive cut resistant material around cables.

In some embodiments, the supporting formations include a plurality of horizontally extending battens fixedly mounted to the roof of the building, and wherein each batten is electrically connected to a common earthing circuit.

In some embodiments, the supporting formations further include a plurality of channels mounted to the battens. In some embodiments, the channels include a U-shaped hook at a lower end of each channel for receiving a lower side of a solar roof tile. The U-shaped hooks are preferably formed of a metallic material having a non-conductible material coating.

In some embodiments, each batten is electrically connected by one or more metal strips extending down a vertical section of the roof between the battens to form a common earthing circuit. In some embodiments, the battens and metal strips extend perpendicularly and are connected by a conductive metal joining bracket. In some embodiments, the battens and metal strips are connected together by one or more conductive screws.

In some embodiments, each batten is electrically connected by one or more earthing wires connected between battens. In some embodiments, the supporting formations include a plurality of metal link channels connecting substantially perpendicularly between adjacent battens and wherein the battens and link channels form a continuous earthing circuit.

In some embodiments, in an engaged operative position, the supporting structure maintains the one or more solar roof tiles in a partially overlaid position with a lower region of the one or more solar roof tiles positioned above a lower roof tile and separated by a vertical gap between the solar roof tile and lower roof tile. The vertical gap preferably provides airflow to internal roof sarking of the roof.

Preferably, each solar roof tile is independently slideably releasable from the supporting structure to provide access to the roof cavity.

A second aspect of the present invention provides a solar roof tile system for a building, the system including:

a supporting structure adapted to be mounted to an existing roof of the building and having one or more supporting formations for supportively engaging one or more solar roof tiles; and one or more solar roof tiles adapted to be releasably engaged with the supporting structure such that the one or more solar roof tiles can be independently released from the roof without removing adjacent solar or non-solar roof tiles, the one or more solar roof tiles having an upper active solar surface and an underside surface;

wherein each of the one or more solar roof tiles include one or more electrical junction boxes disposed on the underside surface for receiving electrical cables to form an electric circuit with others of the one or more solar roof tiles and an inverter; and wherein the supporting formations are fixedly mounted to the existing roof of the building and adapted to releasably support the one or more solar roof tiles in respective operative positions, and wherein each supporting formation is electrically connected to an earthing circuit.

A third aspect of the present invention includes a solar roof tile system for a building, the system including:

a plurality of solar roof tiles adapted to be releasably engaged on the roof in operative positions, wherein each solar roof tile includes one or more junction boxes for electrically connecting to another solar roof tile or to an electrical junction box to form a series electric circuit;

one or more electrical junction boxes configured to electrically connect the plurality of solar roof tiles to an electrical inverter and/or solar battery system;

a plurality of electrical cables for electrically connecting the junction boxes of each solar roof tile and the one or more electrical junction boxes;

wherein the electrical cables include a flexible protective coating that is non-conductive and formed of a cut resistant material; and wherein the electrical cables or protective coatings are colour coded such that cables of a first colour are to be connected to positive junction boxes while cables of a second colour are to be connected to negative junction boxes.

A fourth aspect of the present invention provides a solar roof tile adapted for installing in a roof tile system according to the first, second or third aspects above.

A fifth aspect of the present invention provides a protective housing for containing a solar junction box on a roof of a building, the protective housing including:

a body adapted to be embedded into a roof housing of the roof, the body defining an internal cavity for containing the solar junction box;

a lid attached to an upper region of the body;

a mounting formation adapted to mount the body to the roof housing such that the lid is maintained in-line with or slightly above a roofline of the roof in a closed position.

In some embodiments, the lid is hingedly attached to the upper region of the body.

In some embodiments, the body is formed of water resistant material.

In some embodiments, the lid includes a solar roof tile installed thereon.

In some embodiments, the body includes a lower opening for allowing access to the solar junction box from within the roof housing. In some embodiments, the junction box is mounted to an inside surface of the lower opening.

In some embodiments, the mounting formation includes a flange or rim that extends at least partially around an upper portion of the body and engages with an edge of the roof housing.

In some embodiments, the housing includes one or more apertures for receiving electrical cables from a solar installation.

BRIEF DESCRIPTION OF DRAWINGS

Preferred embodiments of the disclosure will now be described, by way of example only, with reference to the accompanying drawings. It will be appreciated that the embodiments shown are examples only and are not to be taken as limiting the scope of the invention as defined in the claims appended hereto.

DETAILED DESCRIPTION

The preferred embodiments disclosed and illustrated herein will be described with reference to a solar roof tile installation for use on a roof of a building. Use of the terms "solar roof tiles" are intended to refer to solar panels that are integrated into the roofline of a roofing system such as a tiled roof of a building. Solar roof tiles typically sit flush with or closely aligned with adjacent roofing elements such as tiles and replace an equivalent roof element rather than sit on top of it. As such, the solar roof tiles and the associated supporting structure collectively define the roof and roofline of a building having an internal roof cavity (including sarking if installed). Removal of a solar roof tile provides access to the roof cavity. In contrast, conventional solar panels of a rooftop solar system are panels that are mounted onto existing roofing elements such as tiles and sit above the roofline of a roofing system. In these systems, the solar panels do not define the roof or of the building, nor provide access to an internal roof cavity.

Although less preferred, some embodiments of the present invention are applicable to a rooftop solar system that are installed on an existing roof of a building.

Solar Roof Tile System

Figure 1:
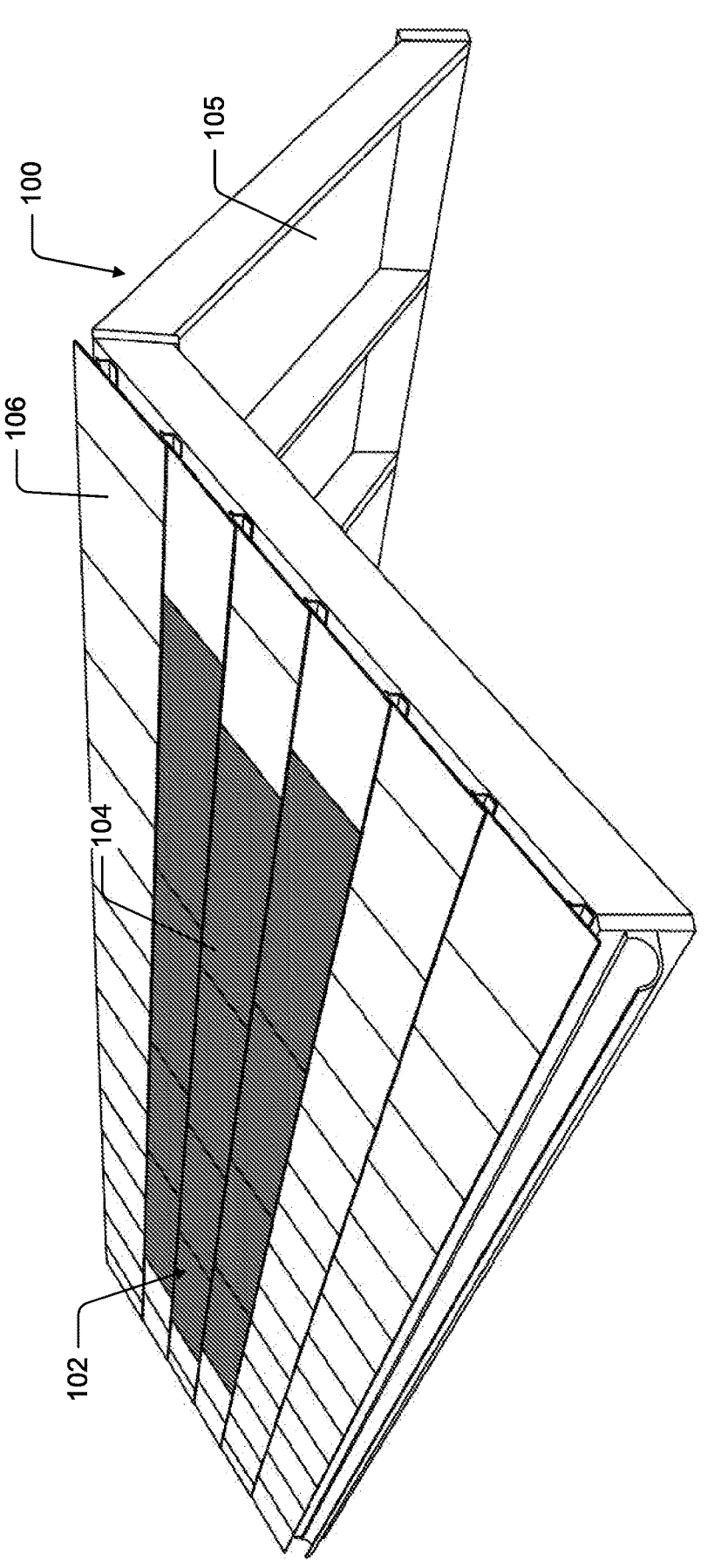
FIG. 1 is a side perspective view of a roof having a solar roof tile system installed thereon.
Figure 2:
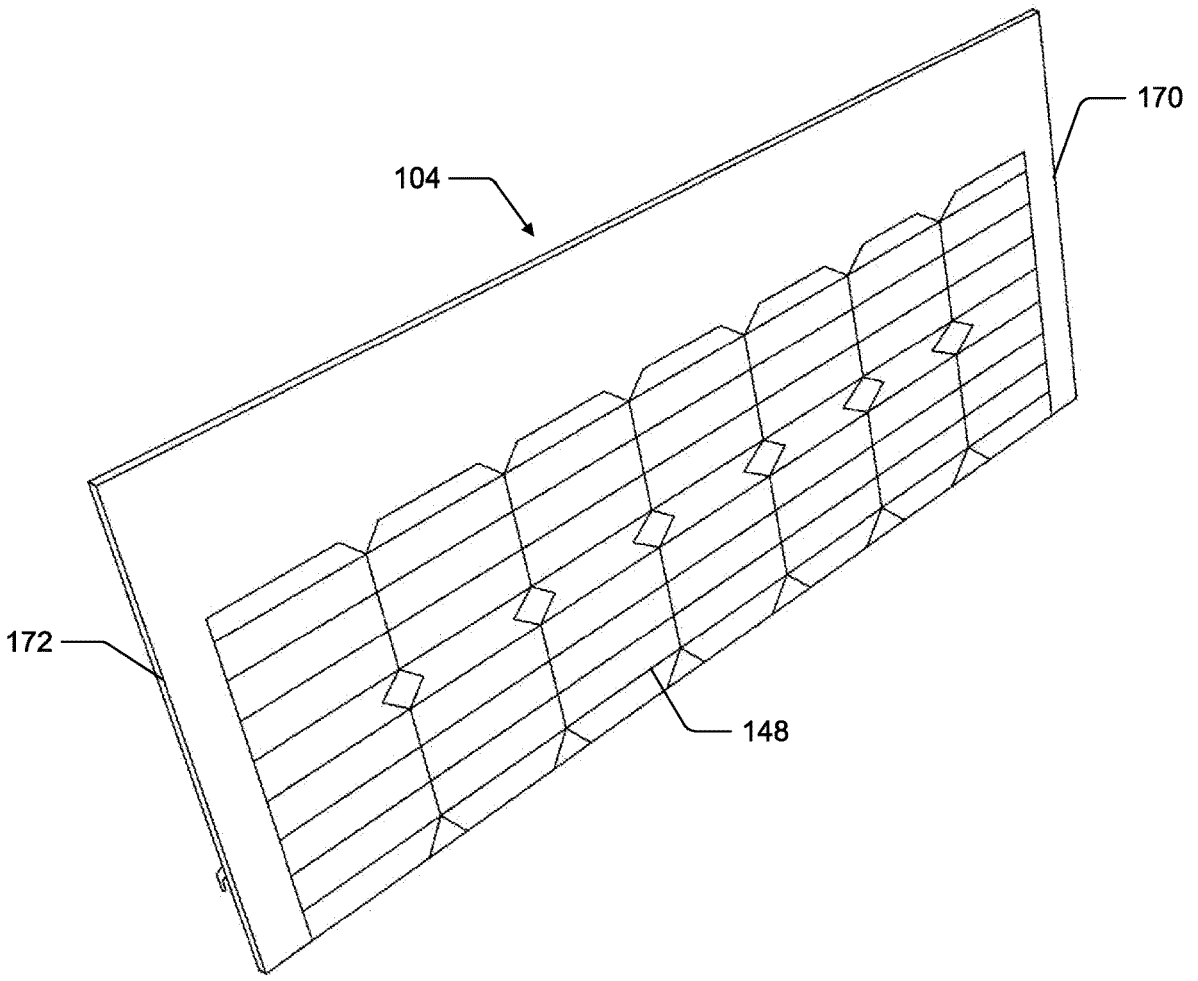
FIG. 2 is a front perspective view of an exemplary solar roof tile, showing a front side of the tile.

Referring initially to FIG. 1, there is illustrated a roof 100 of a building having a solar roof tile system 102 installed thereon. Solar roof tile system 102 is integral with roof 100 and itself forms part of roof 100. System 102 includes a plurality of solar roof tiles 104, each of which include a plurality of embedded solar cells connected in series for converting incident solar radiation into electrical voltage. These embedded solar cells are illustrated in FIG. 2. Although illustrated as a plurality of solar roof tiles 104, it will be appreciated that alternate solar roof tile systems may include only a single solar roof tile. Roof 100 in FIG. 1 also includes a plurality of non-solar roof tiles 106 installed adjacent solar roof tiles 102. In some embodiments, the non-solar roof tiles 106 and solar roof tiles 104 are sold as a single system for installation on a roof. It will be appreciated that the number, size and placement of the solar roof tiles 102 and non-solar roof tiles 104 will be dependent on the shape, size and aspect of the roof 100.

In the illustrated embodiments, the solar roof tiles 104 have dimensions of 1200 mm long by 400 mm high. However, in other embodiments, solar roof tiles 104 have other dimensions and may be of other shapes, such as square, triangular or hexagonal. Preferably, solar roof tiles 104 are substantially planar. However, in some embodiments, solar roof tiles 104 may include a degree of curvature or include other structure such as ridges or corrugations.

Figure 3:
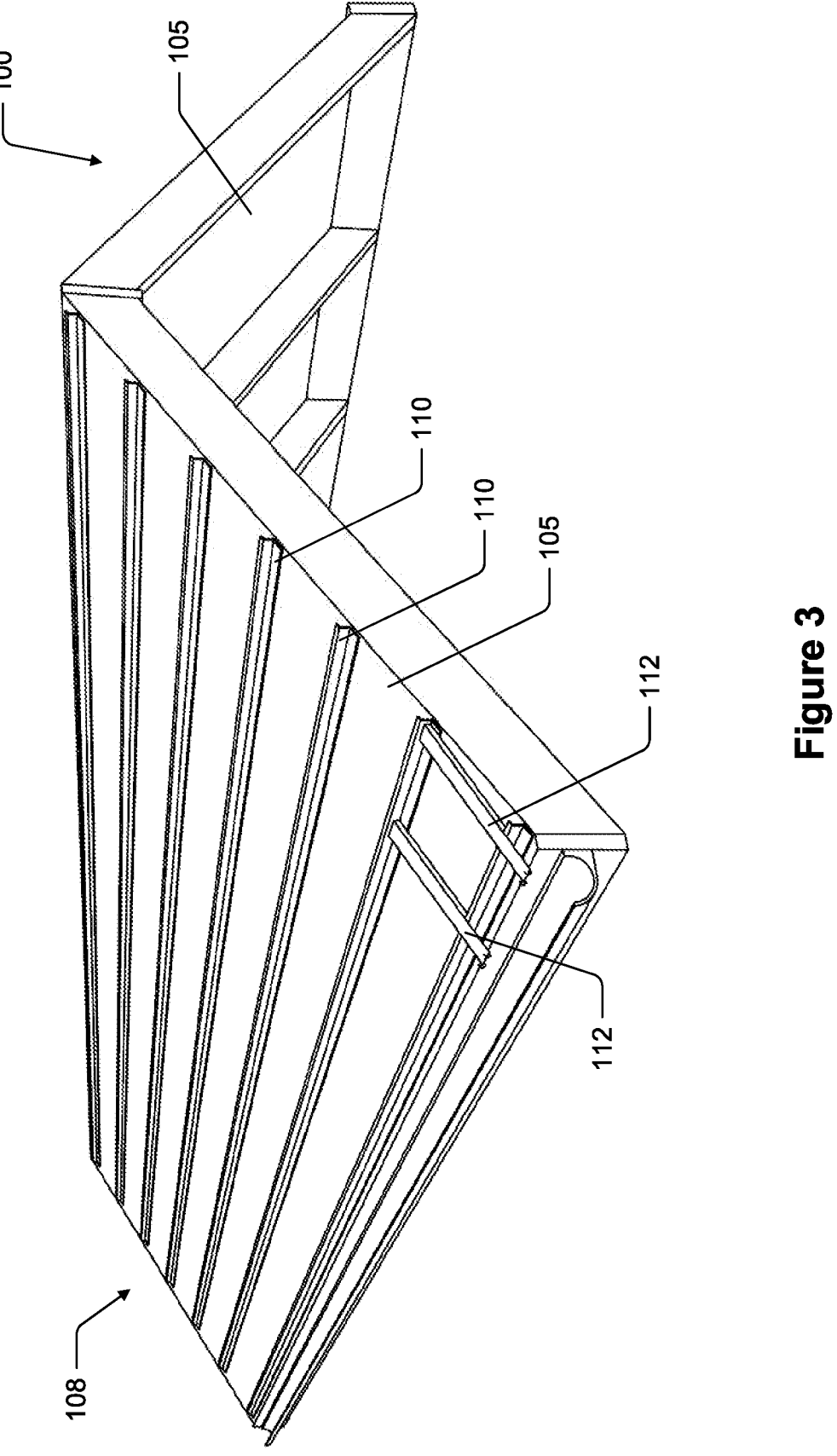
FIG. 3 is a side perspective view of the roof of FIG. 1 showing a roof tile supporting structure being installed thereon, showing an array of roof battens and two link channels.
Figure 4:
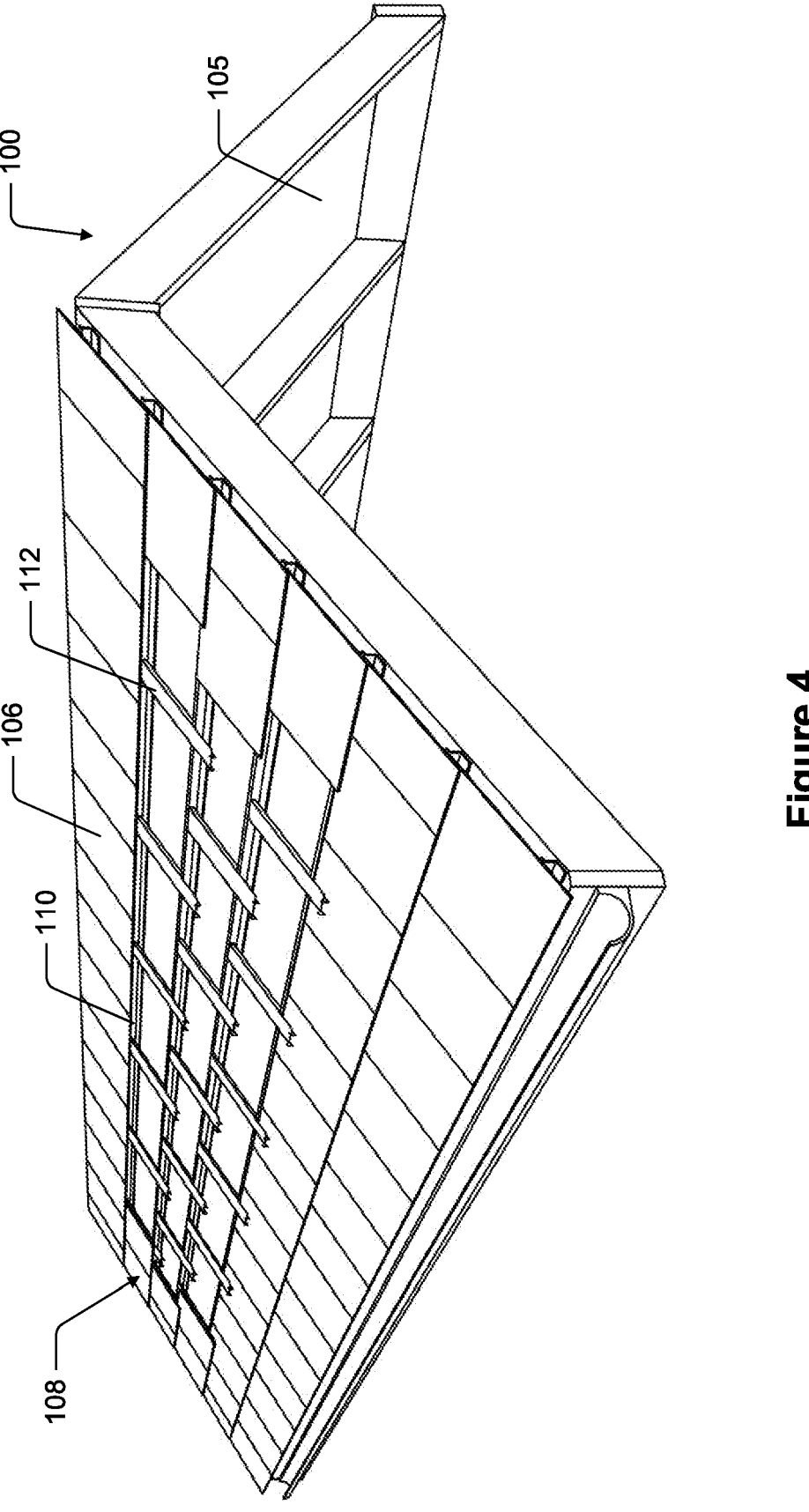
FIG. 4 is a side perspective view of the roof of FIG. 1 showing roof tiles installed on a supporting structure with vacant spaces for installing solar roof tiles.

Referring now to FIGS. 3 and 4, system 102 also includes a supporting structure 108 adapted to be mounted to the building to define roof 100 for supportively engaging the solar roof tiles 104 in the operative position shown in FIG. 1. By way of example, the supporting structure may include the supporting structure described in U.S. Pat. No. 7,444,790 entitled "Weather Strips" and assigned to Nu-Lok Roofing Systems Pty, Ltd. (hereinafter "Nu-Lok"). However, it will be appreciated that the supporting structure may be embodied in other designs. Further, in some embodiments, a supporting structure is provided that fixedly mounts solar roof tiles 104 by fixing means such as screws, bolts or brackets.

As best shown in FIG. 3, supporting structure 108 includes a plurality of supporting formations in the form of vertically separated, horizontally extending battens 110 and link channels 112 which extend downwardly between the battens 110. Battens 110 are fixedly mounted to rafters of the building by way of screws, nails, staples or other fastening devices above a roof sarking layer 105. In other embodiments, supporting structure 108 may be mounted to an existing roof of a building. In these embodiments, battens 110 are fixedly mounted to a surface of the existing roof.

Figure 5:
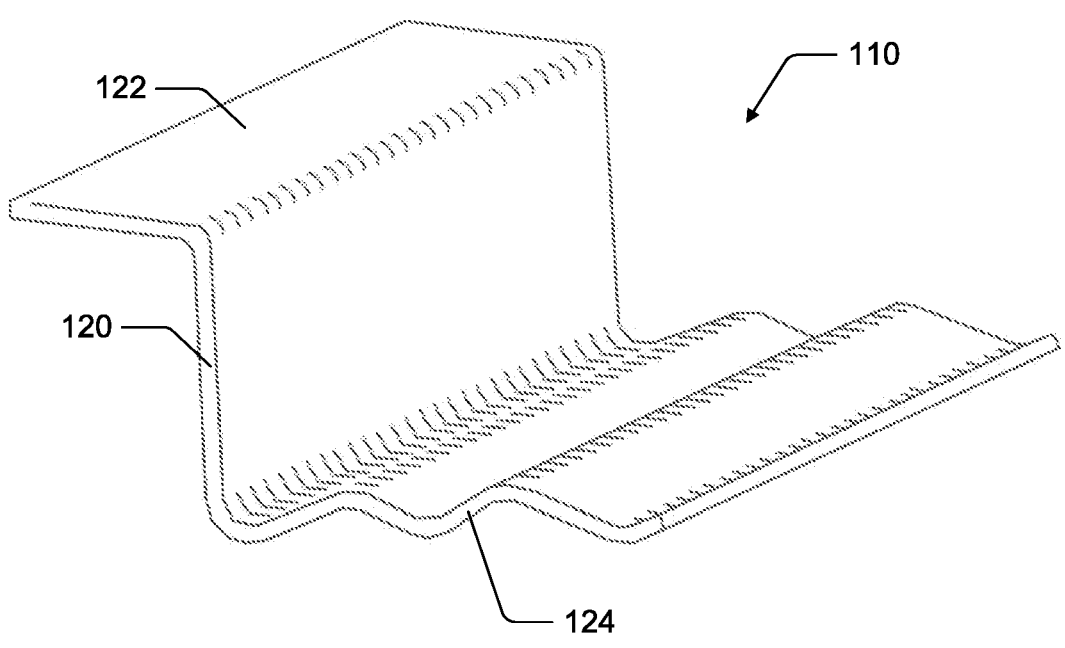
FIG. 5 is a side perspective view of a section of a roof batten used to form a supporting structure for installing roof tiles and solar roof tiles.
Figure 6:
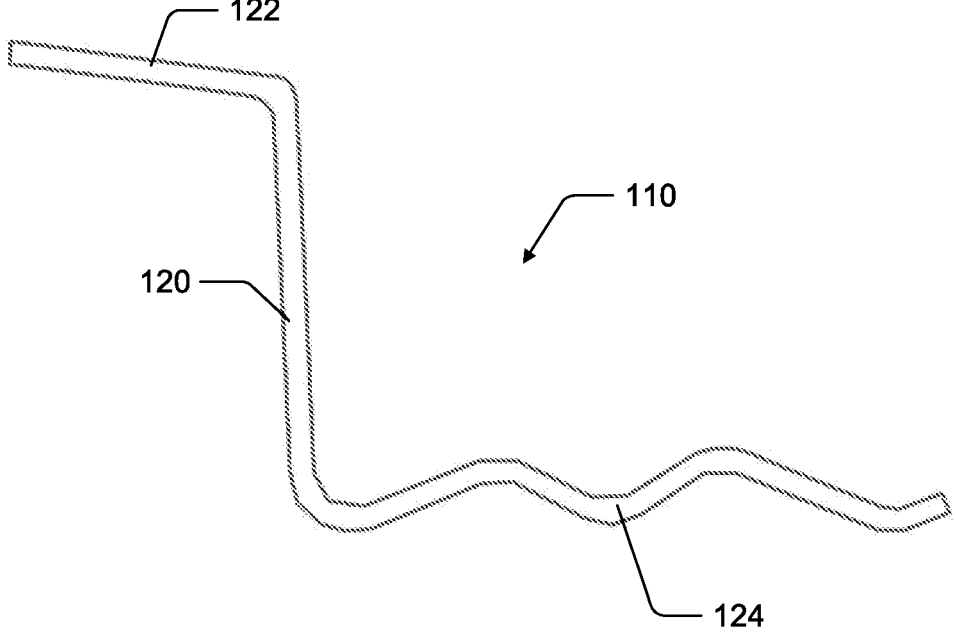
FIG. 6 is a side view of the roof batten of FIG. 5.

FIGS. 5 and 6 illustrate the preferred shape of battens 110. Battens 110 are of a Z shaped type having an upstanding web 120 with a top flange 122 and a bottom flange 124, the top flange 122 and the bottom flange 124 extending in opposite directions. The bottom flange 124 is longitudinally corrugated.

Figure 7:
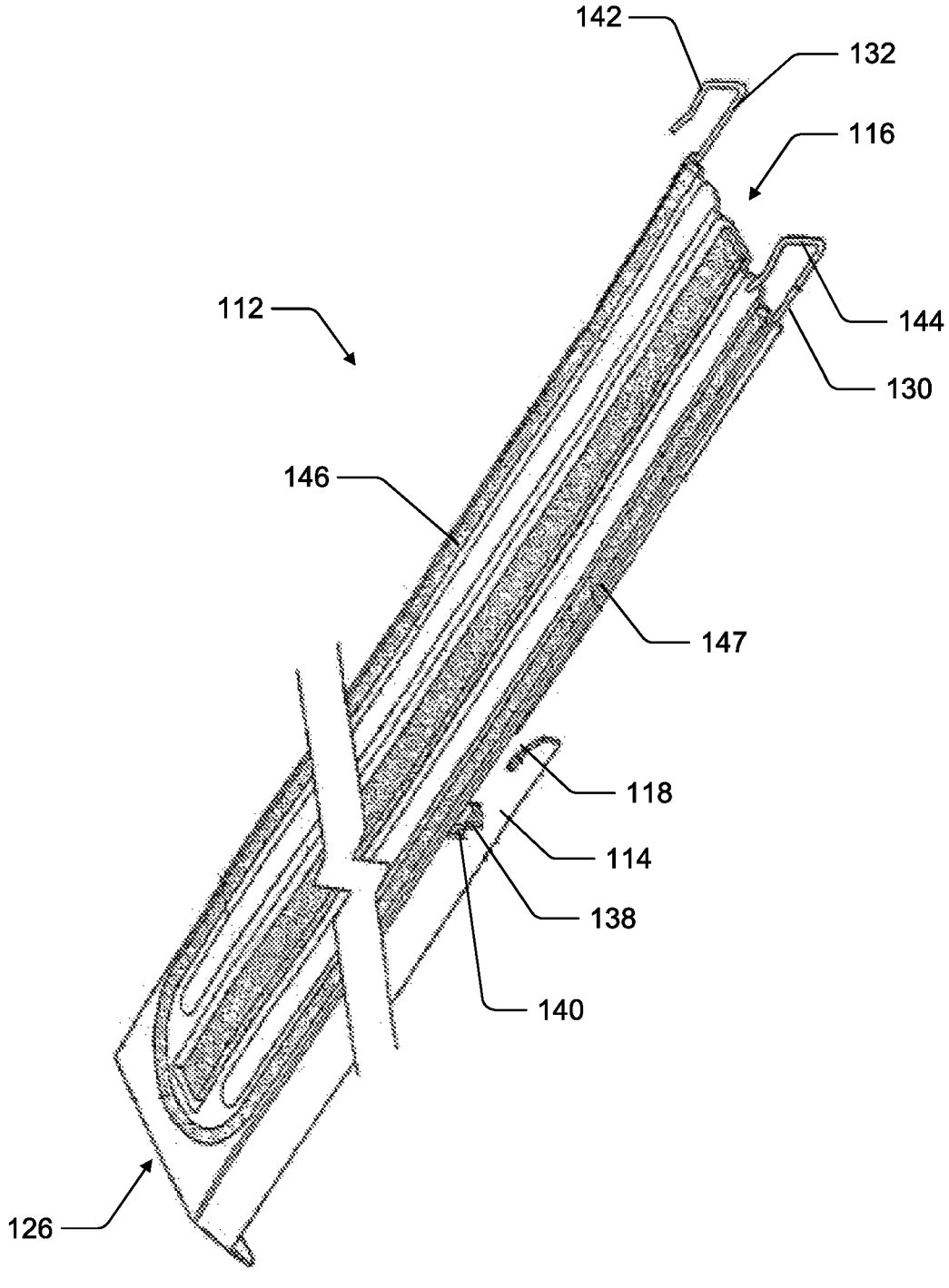
FIG. 7 is a perspective view of a link channel used to form a supporting structure to support roof tiles and solar roof tiles on a roof.

Battens 110 form the foundation of supporting structure 108 upon which link channels 112 can be mounted. FIG. 7 illustrates a perspective view of a link channel 112, where it can be seen that the link channel 112 includes side flanges 114 on each side of the channel. These flanges 114 terminate before a lower end 116 of the channel and, where the side flanges terminate, there is a slot 118 opening towards the lower end 116 of the channel which, in use, engages with the upper flange 122 of an adjacent lower batten 110 as shown in FIG. 3. In the operative position, an upper end 126 of each link channel 112 abuts bottom flange 124 of an adjacent upper batten 110. Two link channels are shown in place in the operative position in FIG. 3, while FIG. 4 illustrates all link channels in place.

Figure 8:
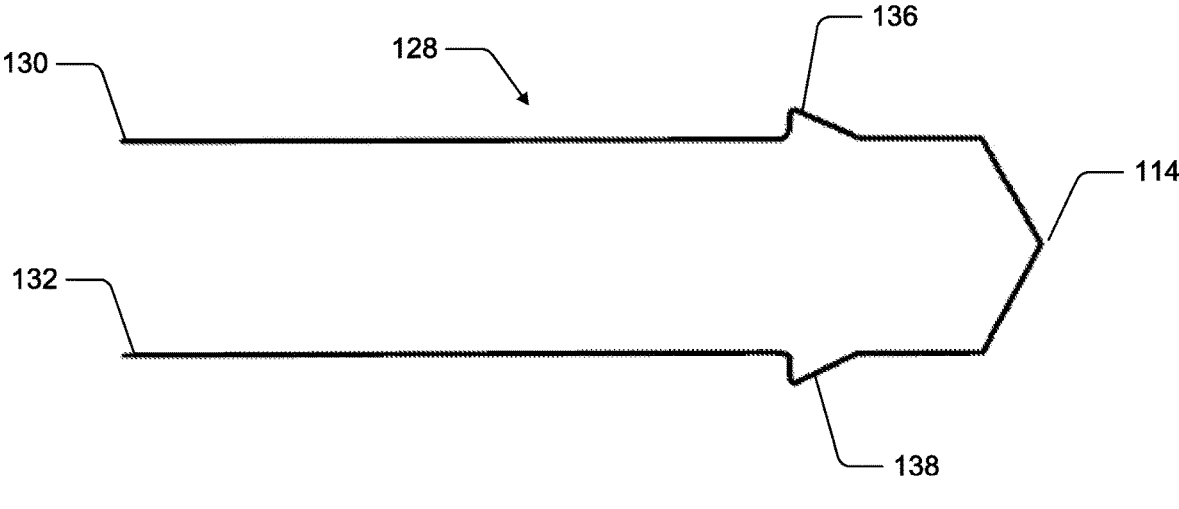
FIG. 8 is a plan view of a retention clip which engages with the link channel of FIG. 7 to support roof tiles and solar roof tiles.

Mounted to and underneath each link channel 112 is a tile retention clip 128. The retention clip 128 is illustrated in detail in FIGS. 8 and 9, and can be seen in place in a link channel 112 in FIG. 7. The tile retention clip 128 is of a generally U shaped having an upper end 130 and legs 132 and 134 along which are ears 136 and 138. These ears 136 and 138 engage in apertures 140 in the side flanges 114 of the link channel 112 (see FIG. 7) when the retaining clip 128 is mounted into link channel 112 to hold it in place. The legs 132 and 134 are preferably divergent away from upper end 128 but, as the retaining clip is manufactured from resilient wire, they can be moved together to enable the ears to be positioned into the apertures 140 at which stage the legs are substantially parallel to each other as shown in FIG. 8. The resiliency of the wire retains the ears 136 and 138 in the apertures 140.

Figure 9:
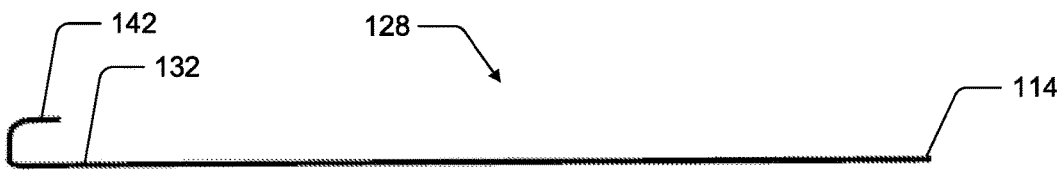
FIG. 9 is a side view of the retention clip of FIG. 8.

Each of the legs 132 and 134 terminate in a hooked portion 142 and 144, as shown in FIGS. 7 and 9, with the hooked portions extending at right angles to the general plane of the retaining clip 112. In some embodiments, retention clip 128 or at least legs 132 and 134 are formed of a metallic material having a non-conductive material coating.

Figure 10:
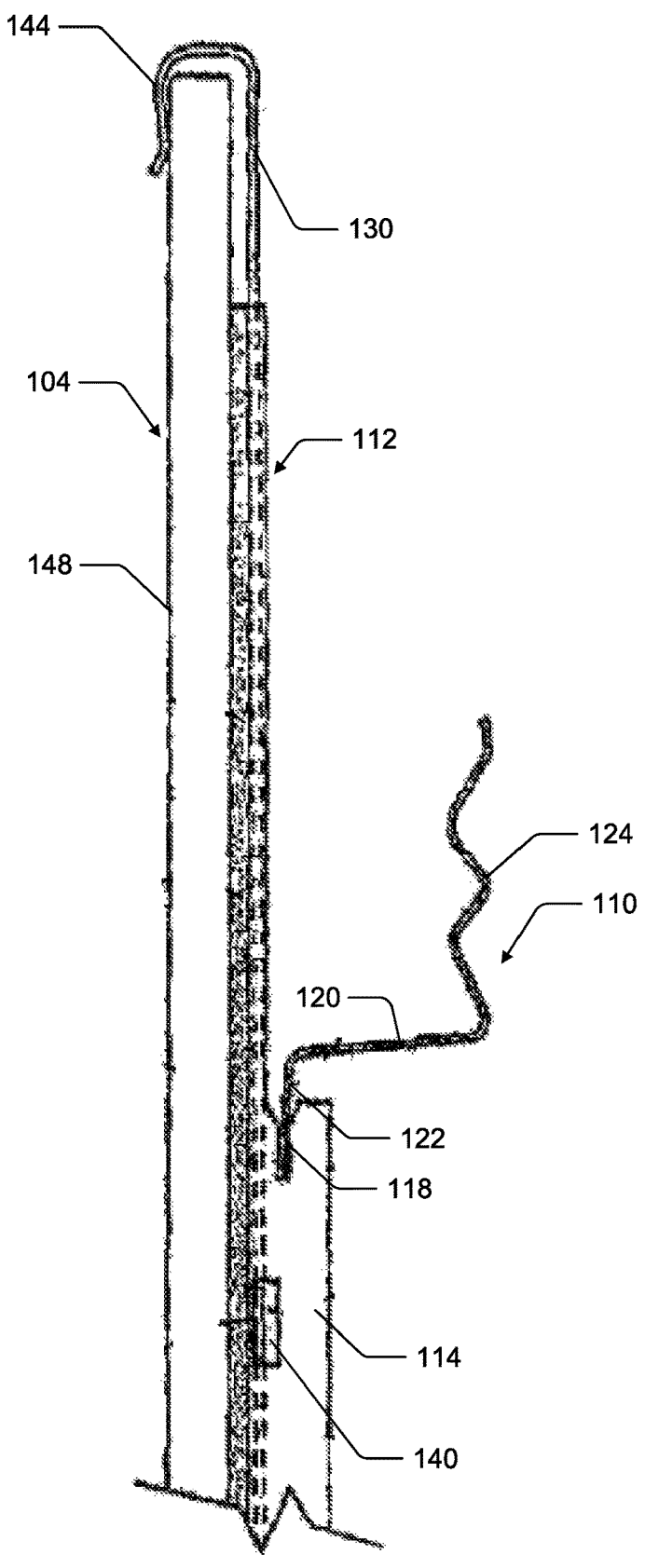
FIG. 10 is a side view of a supporting structure showing a solar roof tile supportively engaged on a link channel which is engaged with a roof batten.

Referring now to FIG. 10, there is illustrated a solar roof tile 104 in a supported operative position in a link channel 112. In the supported operative position, an end of the top flange 122 of batten 110 is received in the slot 118 in the end of the side flange 114 of the weather strip. A solar roof tile 104 sits on the link channel 112 engaging peripheral sealing strips 146 and 147 to provide a seal along the side edge of the tile. The hooked portions 142 and 144 of the retention clip 128 extend over a lower portion of the solar roof tile 104 and engage an upper top surface 148 thereof to prevent movement of the tile. The hooked portions 142 and 144 are sufficiently resilient that different thicknesses of the tile can be received in the hooked portion although retaining clip 128 may have different sized hooked portions if significantly thicker tiles are to be used. Solar roof tiles may have a thickness in the range of 3 mm to 12 mm and hence there may be one retaining clip which has a hooked portion opening such that tiles of 3 mm to 7 mm may be received in it and another with an opening so that tiles between 8 mm and 12 mm can be received in it.

The supporting structure 108 described above is such that solar roof tiles 104 are able to be releasably engaged with link channels 112 such that the solar roof tiles 104 can be independently released from roof 100 without removing adjacent solar or non-solar roof tiles. This provides various advantages associated with accessing the electrical cables and junction boxes on the underside of solar roof tiles 104. Furthermore, the solar roof tiles 104 can each be removed simply by sliding the tile upwards and lifting it over retaining clip 128. This process can be performed simply and easily by hand and there is no need for tools to remove screws or other fastening devices.

Figure 11:
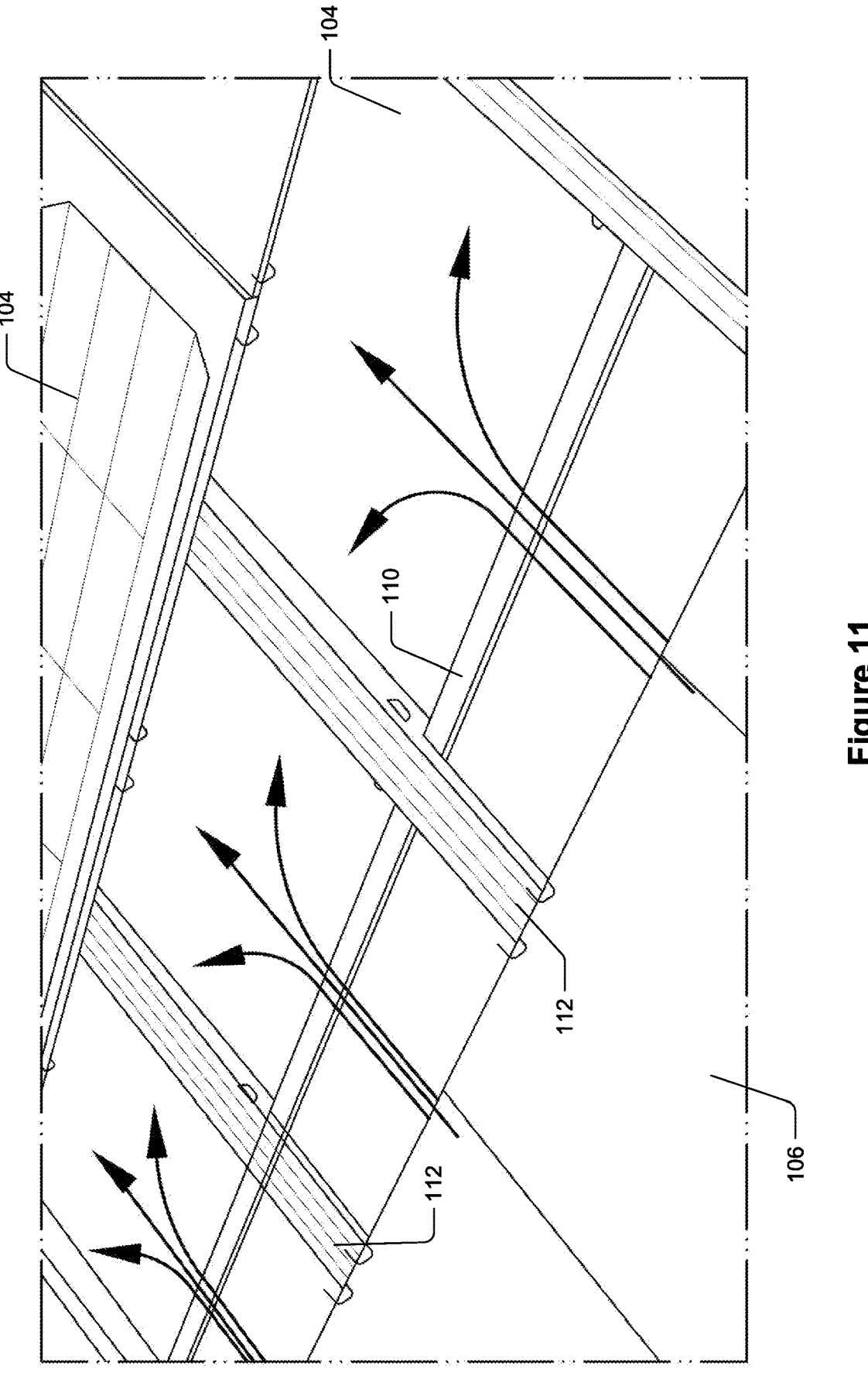
FIG. 11 is a schematic view of a plurality of solar roof tiles installed on a roof and showing air flow underneath the tiles via an air gap.

Referring now to FIG. 11, in an engaged operative position, the supporting structure 108 maintains the solar roof tiles 104 in a partially overlaid position with a lower region of one solar roof tiles positioned above a lower roof tile and separated by a vertical gap of about 3-5 mm between the solar roof tile and lower roof tile. This allows airflow underneath the solar roof tiles airflow to the internal roof sarking 105 of the roof, as illustrated by the arrows in FIG. 11. This airflow helps to reduce the solar roof tiles from overheating in hot conditions, thereby potentially increasing their reliability and operating lifetime.

It will be appreciated that the supporting structure illustrated in FIGS. 3 to 11 is exemplary only and other supporting structures may be used. By way of example, in some embodiments, supporting structure 108 does not include battens 110 and may include vertically extending support formations that attach directly to the frame of the building. However, it is preferable for the supporting formations to releasably support solar roof tiles 104 such that they can be independently removable without the need to remove other tiles. Further, it is preferable that the supporting formations allow the solar roof tiles 104 to be releasably supported in their operable positions without the need for screws such that they can be easily released by hand.

Figure 12:
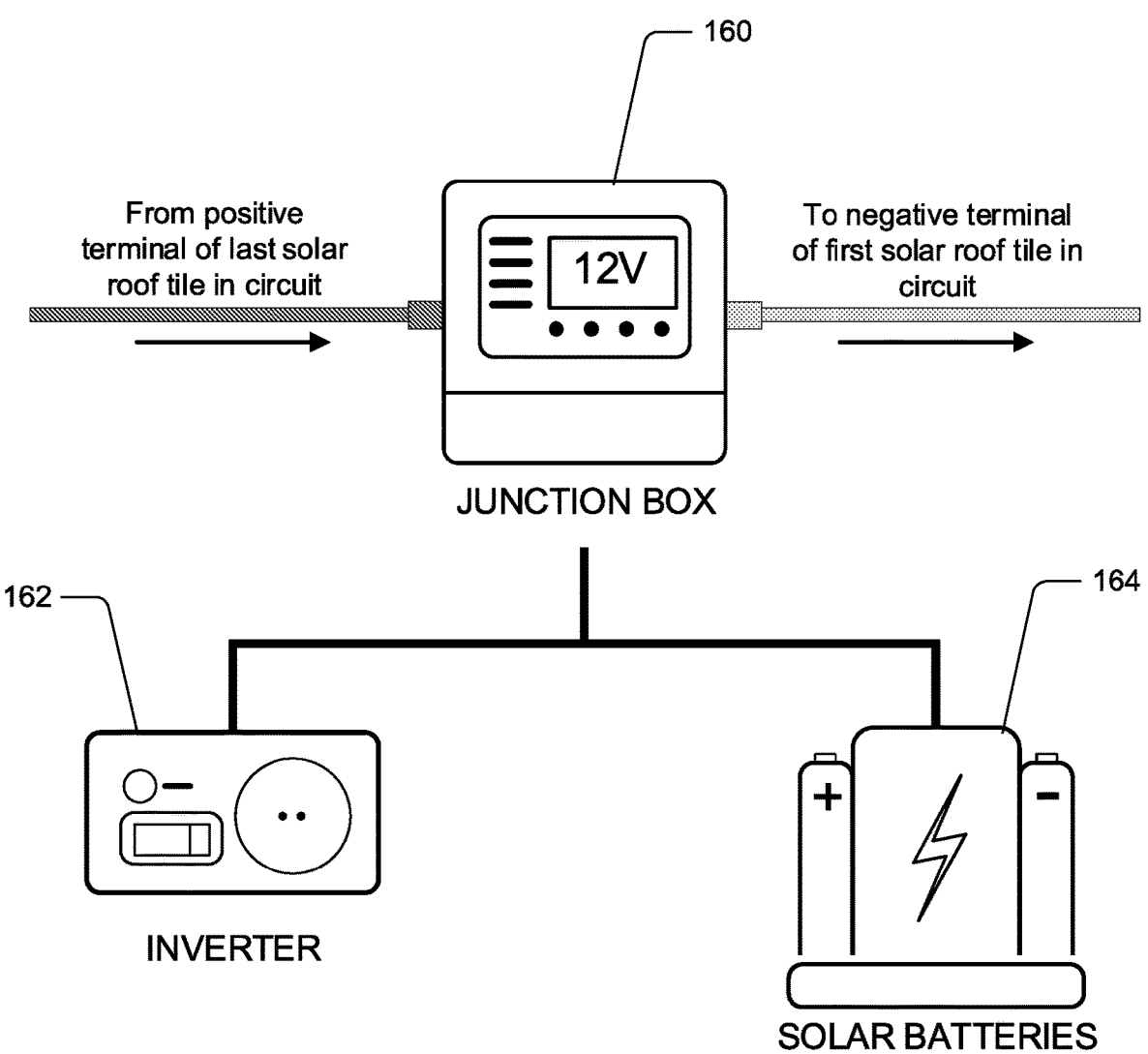
FIG. 12 is a schematic illustration of a solar junction box connecting to an electrical inverter and solar batteries.

During installation of solar roof tiles on roof 100, they are electrically connected in series to adjacent solar roof tiles and subsequently connected to a central junction box 160 as shown in FIG. 12. The central junction box 160 is, in turn, connected to an inverter 162 for converting the generated DC power to AC for normal use and one or more solar batteries 164 for energy storage. Central junction box 160 includes a circuit breaker and a switch to allow a technician or emergency worker to disconnect the solar roof tiles connected to that junction box. In large roofs, solar roof tile system 102 may include a plurality of groups of solar roof tiles, with each group of tiles connected to respective ones of a plurality of central junction boxes.

Figure 13:
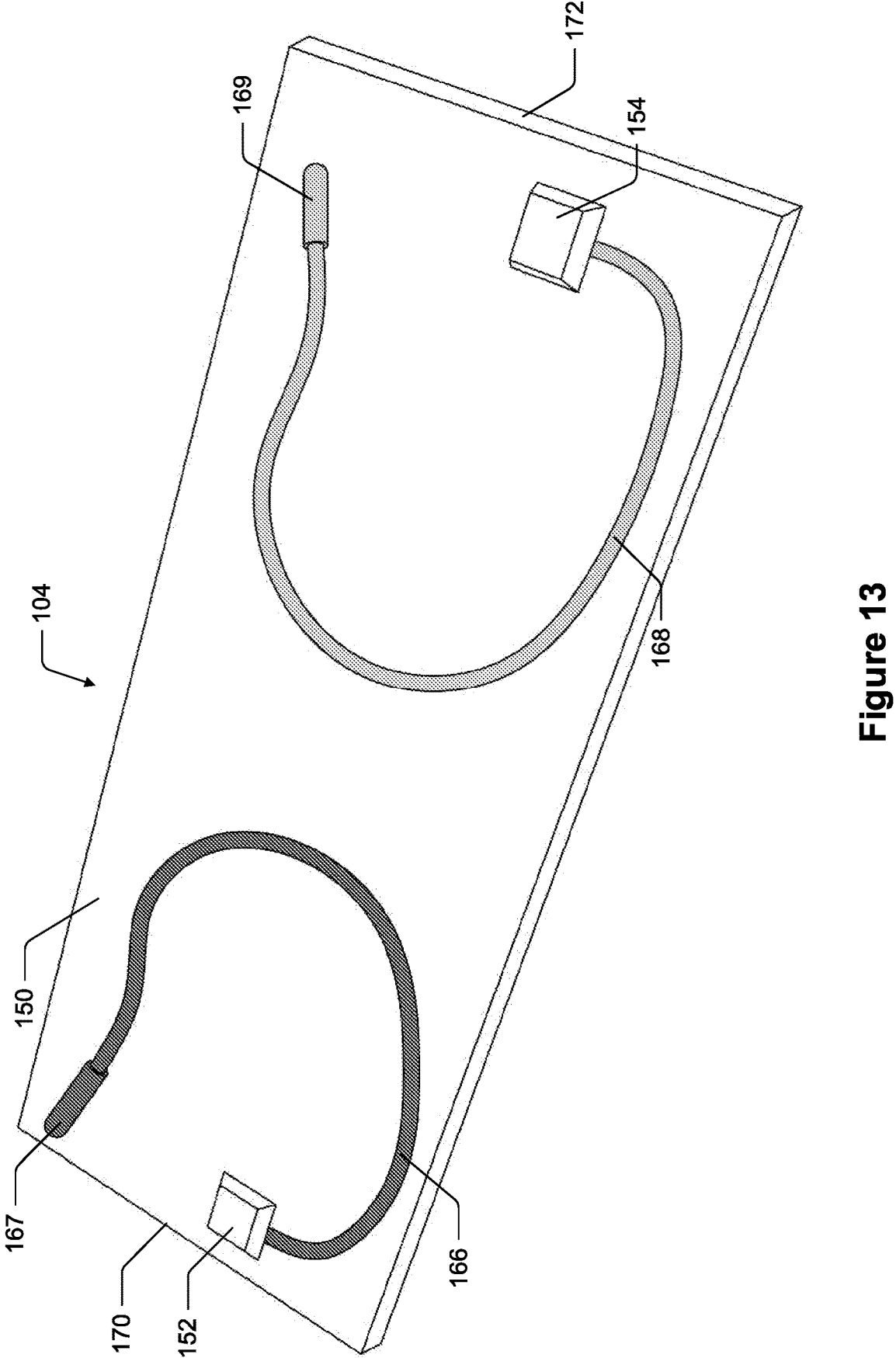
FIG. 13 is a rear perspective view of the solar roof tile of FIG. 1, showing a rear side of the tile with two junction boxes and associated colour coded electrical cables.

Referring now to FIG. 13, an underside 150 of a solar roof tile 104 is shown. Each of the solar roof tiles 104 preferably include a positive electrical junction box 152 disposed at a first location on the underside surface and a negative electrical junction box 154 disposed at a second location on the underside surface separate from the first location. The significance of using two separated junction boxes will be described below. However, it will be appreciated that, in other embodiments, solar roof tiles 104 include only a single junction box having both a positive and negative junction box connected thereto. As the solar roof tiles 104 define the roof 100 of the building, the one or more electrical junction boxes and associated cables that form an electrical circuit are located within the roof cavity.

Each solar roof tile 104 is independently slideably releasable from supporting structure 108 to provide access to the roof cavity, including sarking if installed. Once installed, a solar roof tile 104 can be removed by first sliding the solar roof tile up and over the hooked portions 142 and 144 of retention clip 128. The solar roof tile can then be slid down to provide access to the underside. The electrical cables (described below) can then be disconnected to disconnect the solar roof tile from the electrical grid. A similar process can be performed to install a solar roof tile.

Cable Management System

As illustrated in FIG. 13, each solar roof tile includes a first lateral side 170 and a second lateral side 172 of the rectangular shaped tiles. The positive junction box 152 of tile 104 is located proximal to first lateral side 170 while negative junction box 154 is located proximal to second lateral side 172. In some embodiments, junction boxes are disposed about 60-80 mm from the edge of the respective lateral sides of the solar roof tiles. The junction boxes 152 and 54 are typically about 50-60 mm$^2$ in area and project about 15-20. Further, junction boxes 152 and 154 are preferably located about 150 mm from the top edge of the solar roof tiles to be located away from nearby battens.

Junction box 152 is connected to a first electrical cable 166 having a female connector 167, while junction box 154 is connected to a second electrical cable 168 having a male connector 169. Electrical cables 166 and 168 are appropriately colour coded to indicate the electrical polarity to a technician. By way of example, first cable 166 may be coloured red while second cable 168 may be coloured blue.

Cable 166 is adapted for connecting positive junction box 152 of solar roof tile 104 with a negative junction box 154 of an adjacent solar roof tile via a corresponding second cable 168 of that adjacent tile. Cables 166 and 168 are preferably encased in flexible conduits for protection and electrical isolation. The flexible electrical conduits may be at least partially transparent so that the colour coding of the encased electrical cable can be seen. Alternatively, the flexible electrical conduits themselves may be colour coded. Preferably the flexible electrical conduits are formed of a non-conductive cut resistant material such as an RS PRO Expandable Braided PET Cable Sleeve supplied by RS Components Pty Ltd. Suitable cut resistance is desirable to reduce the risk of a technician or builder working on the roof cutting through the cable. Preferably, the flexible electrical conduits are formed of a continuous sleeve around the cables.

Figure 14:
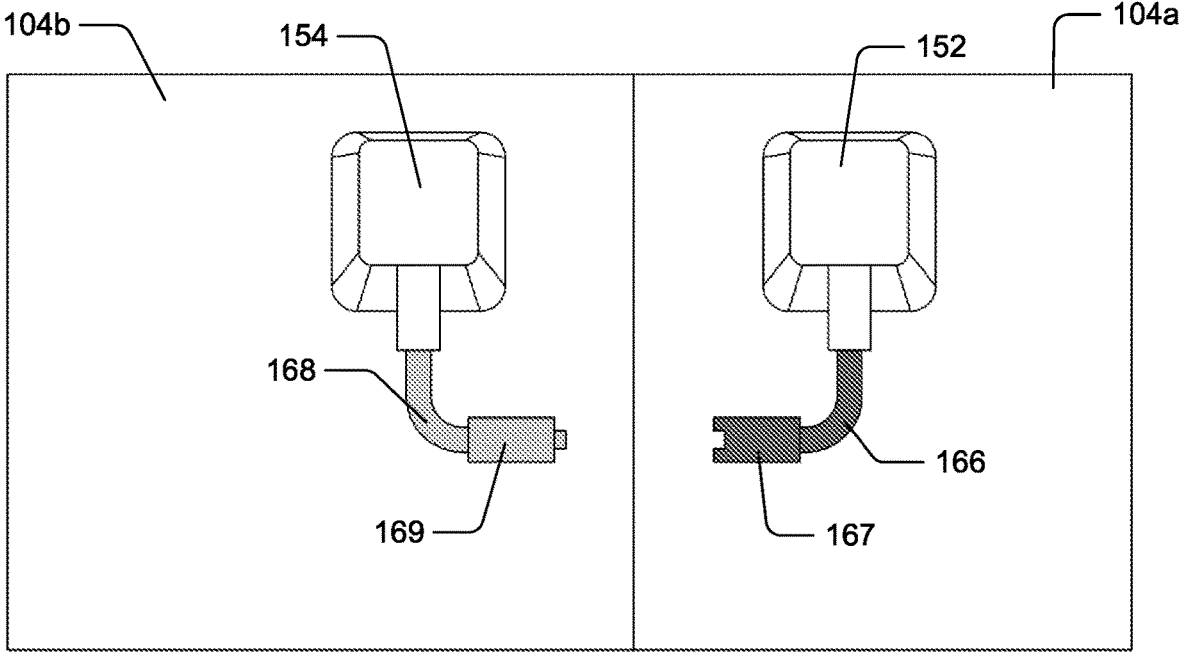
FIG. 14 is a close-up underside view of positive and negative junction boxes of two adjacent solar roof tiles, showing corresponding male and female connectors and cables.

Referring now to FIG. 14, two adjacent solar roof tiles 104a and 104b are shown. As illustrated, the position of junction boxes 152 and 154 are such that, when solar roof tile 104a is installed in an engaged operative position in the supporting structure 108, the positive junction box 152 of the solar roof tile is positioned adjacent a negative junction box 154 of a laterally adjacent second solar roof tile 104b. By way of example, adjacent junction boxes 152 and 154 may be spaced apart by about 160-200 mm when the solar roof tiles are in the operative position. This enables cables 166 and 168 to be made of a short length, such as in the range of 300-400 mm, which reduces the chances of the cables being inadvertently cut or damaged by technicians.

Figure 15:
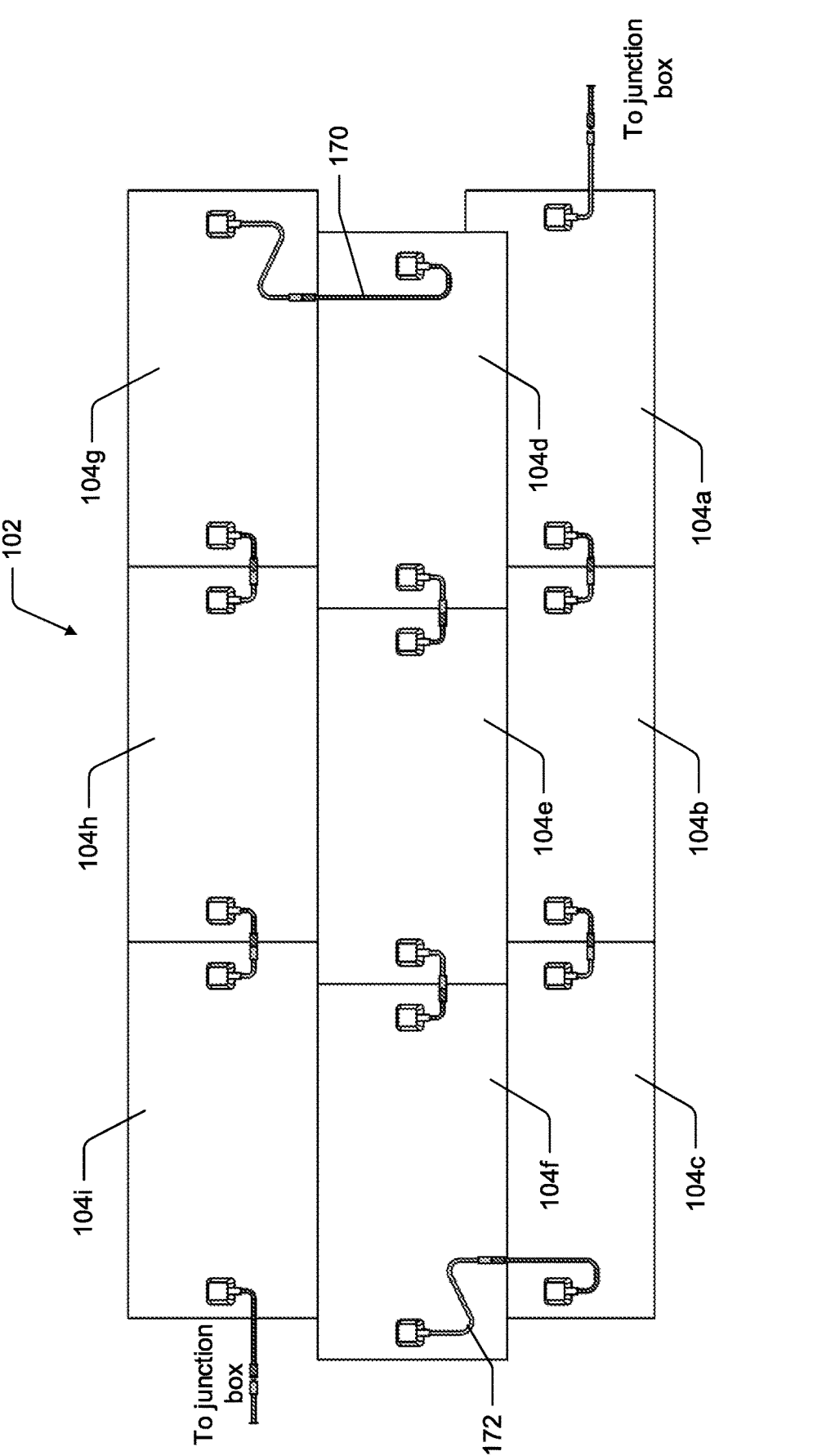
FIG. 15 is an underside view of a solar roof tile system including nine electrically connected solar roof tiles in three vertically staggered rows of three tiles.

As shown in FIG. 15, the solar roof tiles are installed in vertically stacked lateral arrays in a similar manner to non-solar roof tiles. Here, nine solar roof tiles 104a-104i are installed in a 3×3 array. It will be appreciated that any arrangement of solar roof tiles is possible depending on the shape and size of the roof they are installed on. Inter-array cables 170 and 172 connecting between the vertically separated lateral arrays may be made the same length (e.g. 300-400 mm) as between adjacent lateral roof tiles such that only a single cable length is required. However, in other embodiments inter-array cables 170 and 172 may be made longer than the cables connecting adjacent lateral solar roof tiles. The length of cables 166 and 168 are preferably chosen to be a smallest possible length to connect laterally adjacent solar roof tiles and inter-array cables with a small amount of slack for releasing the solar roof tiles from supporting structure 108. Although both the cables from the positive and negative junction boxes are illustrated as being of similar length, it will be appreciated that, in some embodiments, one cable may be made short (e.g. 100-300 mm or less), while the other cable made to be a substantially longer length (e.g. ~600 mm–1 m).

The solar roof tiles 104-104i are connected in a series circuit with a negative junction box of first solar roof tile 104a and a positive junction box of last solar roof tile 104i connected to respective junction boxes of central junction box 160 illustrated in FIG. 12. It will be appreciated that a single roof may include multiple such arrays of solar roof tiles, each connected to a respective junction box that is, in turn, connected to inverter 162 and solar batteries 164.

Although in FIG. 14, cables 166 and 168 are illustrated as exiting junction boxes 152 and 154 in a lower position, it will be appreciated that this need not be the case. In other embodiments, cables 166 and 168 may exit junction boxes 152 and 154 at other angles so as to facilitate simpler and shorter connection to adjacent solar roof tiles. In some embodiments, junction boxes 152 and 154 may be rotatable within a mounting on the solar roof tile 104 such that the angle of the cables can be adjusted.

The above described electrical connections allows all cables from solar tile system 102 to be connected underneath the solar roof tiles and hence within the roof cavity. Further, using the releasable tile system of Nulok, the cables of adjacent solar roof tiles can be easily connected under the link channels 112. This simple cabling system avoids dangers from cables being connected under battens like in existing systems and allows individual solar roof tiles to be removed and disconnected without removing adjacent roof tiles.

Figure 16:
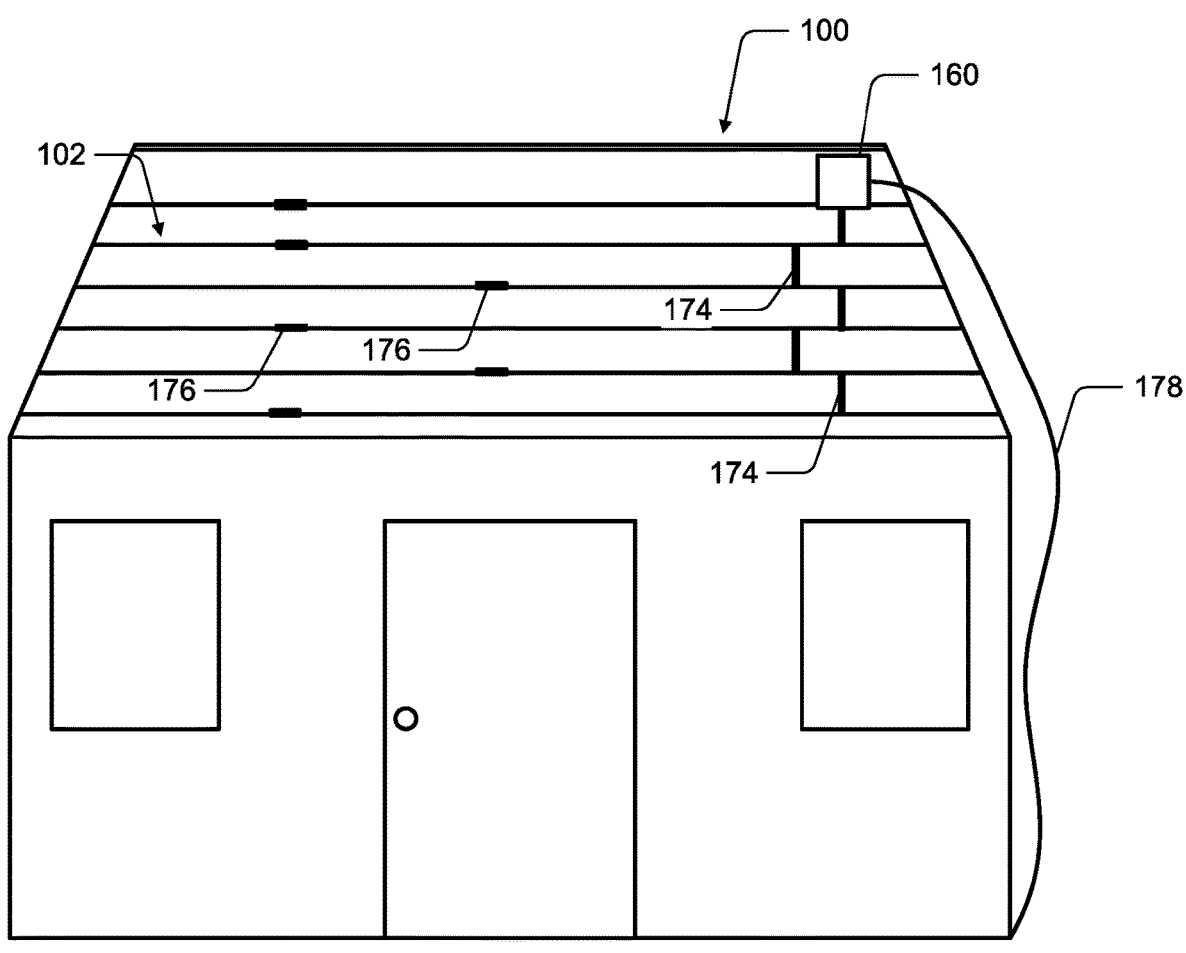
FIG. 16 is a schematic illustration of an earthing circuit for the solar roof tile system of FIG. 1.

Furthermore, in some embodiments, solar roof tile system 102 includes an earthing circuit in which each batten 110 is electrically connected together. An example earthing circuit is shown schematically in FIG. 16. Here, each batten 110 is electrically connected by one or more conductive elements 174 and 176 to form a common earthing circuit for the entire solar roof tile system 102. Alternatively, battens 110 and conductive elements 174 and 176 may be connected so as to form multiple earthing circuits across roof 100. Conductive elements 174 may be formed from conductive metal strips, which extend vertically between battens 110 and connect to the battens via conductive screws or brackets. The joining bracket may be L-shaped or T shaped with connecting formations which engage with the battens and metal strips. Alternatively, conductive elements may include earthing wires clipped to adjacent battens 110. Conductive elements 176 are used to connect different lengths of batten 110 which are laid end-to-end to form a longer batten. Typical batten lengths are about 4 m so larger roofs may require multiple batten lengths to form a single batten. In this case, batten lengths may be electrically connected together by conductive elements 176 which include conductive metal brackets and/or conductive metal screws.

In some embodiments, link channels 112 are formed of conducting material such as metal and electrically link between adjacent battens 110 to form a continuous earthing circuit across all battens. In these embodiments, the link channels 112 themselves act as the conducting elements between battens 110.

In embodiments where supporting structure 108 does not include battens 110, conductive elements 176 may be connected between link channels 112 or other equivalent supporting formations.

To complete the earthing circuit, central junction box 160 is connected to an earthing cable 178, which is electrically grounded. Such an earthing circuit allows for simultaneously earthing all battens and link channels forming the supporting structure 108 in the event that one element becomes electrically active. This is particularly useful where the link channels 112 are not entirely formed of a conductive element or where supporting structure 108 does not include link channels 112. Where link channels 112 are formed of a conductive material, these link channels may take the place of the conductive elements 174 to electrically connect adjacent battens.

Integrated Junction Box

Figure 17:
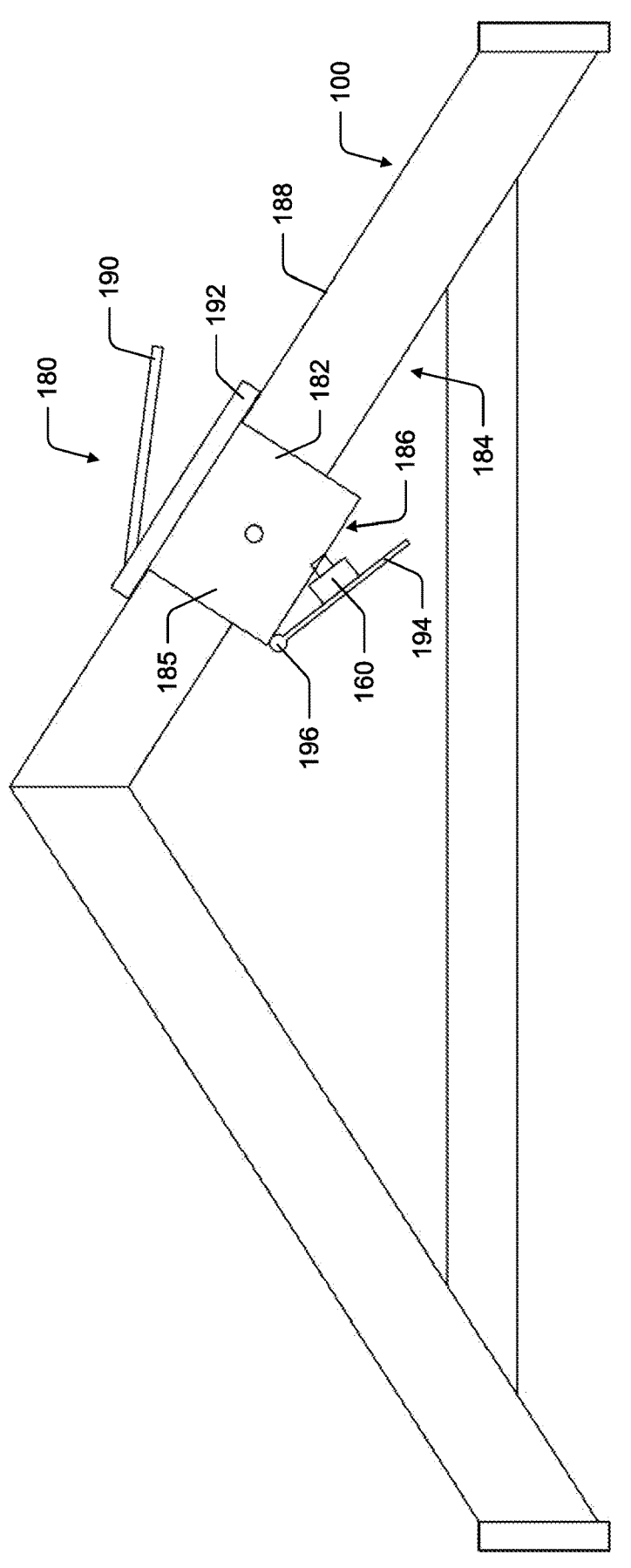
FIG. 17 is a side cross section of a roof having a solar junction box housing installed therein.
Figure 18:
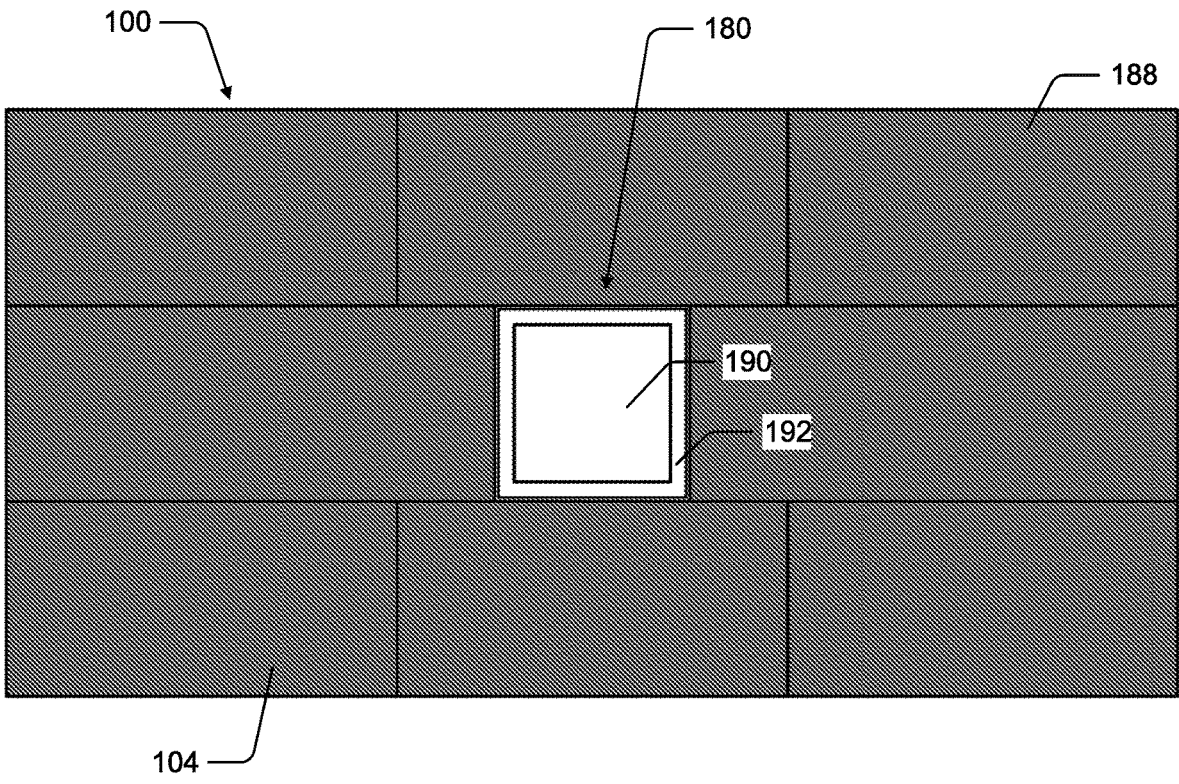
FIG. 18 is a plan view of the roof and solar junction box housing of FIG. 16.

Referring now to FIGS. 17 and 18, there is illustrated a protective housing 180 for containing a central junction box 160 on a roof 100 of a building. Protective housing 180 includes a body 182 adapted to be embedded into a roof housing 184 of roof 100. In the illustrated embodiment, body 182 is substantially rectilinear in shape having four sidewalls (e.g. 185) formed of a water resistant and material such as galvanised steel (e.g. Colorbond™ steel) or plastics material. However, in other embodiments, body 182 may be formed of other shapes such as a cylindrical shape.

The sidewalls of body 182 define an internal cavity 186 for containing central junction box 160, as shown best in FIG. 17. The sidewalls are of sufficient dimension so as to extend from a roofline 188 of roof 100 (defined by upper surfaces of roof tiles and/or solar roof tiles) through roof housing 184 including sarking layer 105 (see FIGS. 1, 3 and 4). By way of example, housing 184 may have a cross sectional area of about 200 mm to 400 mm and a depth of about 150-200 mm. This size is sufficient to contain two conventional junction boxes within cavity 186. In some embodiments, larger dimension housings may be used to house a larger number of junction boxes.

Housing 180 also includes a lid 190 attached to an upper region of the body 182. In the illustrated embodiment, lid 190 is hingedly attached to the upper region of body 182 by way of a hinge joint (not shown). The hinge joint is preferably located on an upper section of body 182 when housing 180 is positioned on roof 100 so that the lid may be opened from a lower side and so that the lid is maintained in a closed position under the influence of gravity. However, in other embodiments, lid 190 may be releasably or slideably mounted to body 182 through other means such as via clips or hooks, or via a snug fit or interference fit arrangement with body 182. In some embodiments, only a section of lid 190 such as a central region is hingedly mounted to open while a peripheral region is fixed to bod 182.

Lid 190 is preferably substantially planar so as to match the general angle and appearance of the surrounding roofline 188. In some embodiments, lid 190 is coloured to substantially match a colour of the surrounding roof tiles or solar roof tiles. In some embodiments, lid 190 is formed of or includes an embedded roof tile that substantially matches the colour of surrounding roof tiles. In some embodiments, lid 190 includes a solar roof tile installed thereon which is connected into a series of solar roof tiles that are connected to central junction box 160. In some embodiments, lid 190 has dimensions such that is can be releasably engaged in the supporting structure 108 described above and integrate seamlessly with solar roof tile system 102.

Housing 180 also includes a mounting formation in the form of a rim 192 adapted to mount body 182 to roof housing 184 such that lid 190 is maintained in-line with or slightly above roofline 188 when in a closed position. Rim 192 includes an outwardly projecting formation that extends wider than the remainder of body 182 and which can abut an upper surface of roof housing 184 as illustrated in FIG. 17. Rim 182 may extend partially or fully around the circumference of body 182. In some embodiments, rim 192 is replaced by one or more projecting flanges that engage with roof housing 184. In other embodiments, the mounting formation includes more conventional mounting structures such as bolts, screws, nails or brackets.

In some embodiments, lid 190 serves as the mounting formation and mounts in the supporting structure 108 as described above.

Body 182 also includes a lower opening 194 disposed on an underside thereof for allowing access to central junction box 160 from within roof housing 184. Lower opening 194 is hingedly mounted to body 182 by a hinge joint 196 such that, in a closed position, lower opening 194 forms a base of body 182. In the illustrated embodiment, central junction box 160 is mounted to an inside surface of lower opening 194 providing easy access to central junction box 160 when lower opening is opened. However, in other embodiments, central junction box 160 may be situated or mounted to other regions inside cavity 186 such as on sidewall 185.

Body 182 includes one or more apertures 198 for receiving electrical cables from surrounding solar roof tiles of a solar installation. Apertures 198 may be formed in one or more sidewalls 185 of body 182.

To install junction box housing 180, a hole is first cut in the roof housing 184, including the sarking layer. Next, surrounding roof tiles and/or solar roof tiles are installed in the manner described above. Following this, housing 180 is inserted into the hole in the roof housing 184 such that rim 192 is engaged with roofline 188, which may be an upper surface of adjacent roof tiles or solar roof tiles, or a surface of roof housing 184 such as rafter beams. Rim 192 may be secured to roofline 188 with an adhesive or other attachment means such as screws or nails. Alternatively, rim 192 may be engaged with the supporting structure 108 described above or otherwise releasably mounted to roof housing 184 by simply being maintained under its own weight in the hole. In some embodiments, rim 192 may include a sealing layer such as a rubber layer around a lower edge to seal with roofline 188. The sarking layer may be sealingly attached to body 182 to prevent water leakage into the roof housing 184.

When installed on roof 100, junction box housing 180 provides an aesthetically similar look to the surrounding roof structure, while providing a safe weatherproof housing for junction boxes with simple access.

Although junction box housing 180 is illustrated as extending perpendicularly from roofline 188, it will be appreciated that, in other embodiments, housing 180 extends vertically downward regardless of the angle of the roofline 188.

Although described with reference to a solar roof tile installation, it will be appreciated that solar junction box housing 180 may be used to house a junction box for a traditional solar panel installation.

Interpretation

Where any or all of the terms "comprise", "comprises", "comprised" or "comprising" are used in this specification (including the claims) they are to be interpreted as specifying the presence of the stated features, integers, steps or components, but not precluding the presence of one or more other features, integers, steps or components.

Reference throughout this specification to "one embodiment", "some embodiments" or "an embodiment" means that a particular feature, structure or characteristic described in connection with the embodiment is included in at least one embodiment of the present disclosure and potentially multiple embodiments. Thus, appearances of the phrases "in one embodiment", "in some embodiments" or "in an embodiment" in various places throughout this specification are not necessarily all referring to the same embodiment. Furthermore, the particular features, structures or characteristics may be combined in any suitable manner, as would be apparent to one of ordinary skill in the art from this disclosure, in one or more embodiments.

Furthermore, while some embodiments described herein include some but not other features included in other embodiments, combinations of features of different embodiments are meant to be within the scope of the disclosure, and form different embodiments, as would be understood by those skilled in the art. For example, in the following claims, any of the claimed embodiments can be used in any combination.

Similarly, it is to be noticed that the term coupled, when used in the claims, should not be interpreted as being limited to direct connections only. The terms "coupled" and "connected," along with their derivatives, may be used. It should be understood that these terms are not intended as synonyms for each other. Thus, the scope of the expression a device A coupled to a device B should not be limited to devices or systems wherein an output of device A is directly connected to an input of device B. It means that there exists a path between an output of A and an input of B which may be a path including other devices or means. "Coupled" may mean that two or more elements are either in direct physical, electrical or optical contact, or that two or more elements are not in direct contact with each other but yet still co-operate or interact with each other.

As used herein, unless otherwise specified the use of the ordinal adjectives "first", "second", "third", etc., to describe a common object, merely indicate that different instances of like objects are being referred to, and are not intended to imply that the objects so described must be in a given sequence, either temporally, spatially, in ranking, or in any other manner. In this manner, when any methods described herein include several steps, no ordering of such elements is implied, unless specifically stated.

Thus, while there has been described what are believed to be the preferred embodiments and applications of the disclosure, those skilled in the art will recognize that other and further modifications may be made thereto without departing from the spirit of the disclosure, and it is intended to claim all such changes and modifications as fall within the scope of the disclosure. For example, any formulas given above are merely representative of procedures that may be used. Functionality may be added or deleted from the block diagrams and operations may be interchanged among functional blocks. Steps may be added or deleted to methods described within the scope of the present disclosure.

The claims defining the invention are as follows:

1. A solar roof tile system for a building, the system including:

a supporting structure adapted to be mounted to the building and having one or more supporting formations for supportively engaging one or more solar roof tiles, wherein the supporting structure and the one or more solar roof tiles collectively define a roof of the building having an internal roof cavity;

one or more solar roof tiles adapted to be releasably engaged with the supporting structure such that the one or more solar roof tiles can be independently released from the roof to access the roof cavity without removing adjacent solar or non-solar roof tiles, the one or more solar roof tiles having an upper active solar surface and an underside surface;

wherein each of the one or more solar roof tiles include one or more electrical junction boxes disposed on the underside surface for receiving electrical cables to form an electric circuit with others of the one or more solar roof tiles and an inverter;

wherein the supporting formations are fixedly mounted to the building and adapted to releasably support the one or more solar roof tiles in respective operative positions; and wherein, in an engaged operative position, the supporting structure maintains the one or more solar roof tiles in a partially overlaid position with a lower region of the one or more solar roof tiles positioned above a lower roof tile and separated by a vertical gap between the solar roof tile and lower roof tile.

2. The solar roof tile system according to claim 1 wherein each of the one or more solar roof tiles include a positive junction box disposed at a first location on the underside surface and a negative junction box disposed at a second location on the underside surface separate from the first location.

3. The solar roof tile system according to claim 1 wherein the one or more solar roof tiles include a first lateral side and a second lateral side and wherein the first location is adjacent the first lateral side and the second location is adjacent the second lateral side.

4. The solar roof tile system according to claim 2 wherein, in an engaged operative position in the supporting structure, the positive junction box of a first solar roof tile is positioned adjacent the negative junction box of a laterally adjacent second solar roof tile.

5. The solar roof tile system according to claim 4 wherein the one or more solar roof tiles include flexible electrical conduits for connecting the positive junction box of the first solar roof tile to the negative junction box of the second solar roof tile.

6. The solar roof tile system according to claim 5 wherein the flexible electrical conduits are colour coded based on electrical polarity.

7. The solar roof tile system according to claim 5 wherein the flexible electrical conduits include a non-conductive cut resistant material around cables.

8. The solar roof tile system according to claim 1 wherein the supporting formations include a plurality of horizontally extending battens fixedly mounted to the building, and wherein each batten is electrically connected to a common earthing circuit.

9. The solar roof tile system according to claim 8 wherein the supporting formations further include a plurality of channels mounted to the battens and including a U-shaped hook at a lower end of each channel for receiving a lower side of a solar roof tile.

10. The solar roof tile system according to claim 9 wherein the U-shaped hooks are formed of a metallic material having a non-conductible material coating.

11. The solar roof tile system according to claim 8, wherein each batten is electrically connected by one or more metal strips extending down a vertical section of the roof between the battens to form the common earthing circuit.

12. The solar roof tile system according to claim 11 wherein the battens and metal strips extend perpendicularly and are connected by a conductive metal joining bracket.

13. The solar roof tile system according to claim 11 wherein the battens and metal strips are connected together by one or more conductive screws.

14. The solar roof tile system according to claim 8 wherein each batten is electrically connected by one or more earthing wires connected between battens.

15. The solar roof tile system according to claim 8 wherein the supporting formations include a plurality of metal link channels connecting substantially perpendicularly between adjacent battens and wherein the battens and link channels form a continuous earthing circuit.

16. The solar roof tile system according to claim 1 wherein the vertical gap provides airflow to internal roof sarking of the roof.

17. The solar roof tile system according to claim 1 wherein each solar roof tile is independently slideably releasable from the supporting structure to provide access to the roof cavity.

18. A solar roof tile system for a building, the system including:

a plurality of solar roof tiles adapted to be releasably engaged on a supporting structure mounted to a roof of the building in operative positions, wherein each solar roof tile includes one or more junction boxes for electrically connecting to another solar roof tile or to an electrical junction box to form a series electric circuit;

one or more electrical junction boxes configured to electrically connect the plurality of solar roof tiles to an electrical inverter and/or solar battery system;

a plurality of electrical cables for electrically connecting the junction boxes of each solar roof tile and the one or more electrical junction boxes;

wherein the electrical cables include a flexible protective coating that is non-conductive and formed of a cut resistant material; and wherein the protective coatings are colour coded such that cables of a first colour are to be connected to positive junction boxes while cables of a second colour are to be connected to negative junction boxes;

wherein the supporting structure and the one or more solar roof tiles collectively define a roof of the building having an internal roof cavity; and wherein one or more of the solar roof tiles are adapted to be releasably engaged with the supporting structure such that the one or more solar roof tiles can be independently released from the roof to access the roof cavity without removing adjacent solar or non-solar roof tiles.

19. A solar roof tile adapted for installing in a roof tile system according to claim 1.

20. The solar roof tile system according to claim 1 wherein the solar roof tile system has an underside comprising an open configuration, thereby allowing access from beneath the system to the one or more electrical junction boxes and or the electrical cables.

21. The solar roof tile system according to claim 1 wherein the solar roof tile system has an underside comprising an open configuration, thereby allowing access to a roof cavity below the system when the one or more solar roof tiles are independently released from the roof.

22. The solar roof tile system according to claim 1 wherein the solar roof tile system has an underside comprising an open configuration, thereby allowing direct air communication between the underside surface of the one or more solar roof tiles and a roof cavity below the system to provide extra space for improved airflow under the one or more solar roof tiles.

* * * * *